United States Patent
Langguth (10) Patent No.: US 6,523,881 B1
(45) Date of Patent: Feb. 25, 2003

(54) FOLDING ROOF FOR A CONVERTIBLE

(75) Inventor: Martin Langguth, Krailling (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/655,873

(22) Filed: Sep. 6, 2000

(30) Foreign Application Priority Data

Sep. 6, 1999 (DE) .......................................... 199 42 427

(51) Int. Cl.[7] .................................................. B60J 7/00
(52) U.S. Cl. ............................ 296/107.12; 296/107.01; 296/112; 296/121; 296/107.09
(58) Field of Search ............................ 296/107.01, 111, 296/112, 116, 117, 121, 107.09, 107.11, 107.12

(56) References Cited

U.S. PATENT DOCUMENTS

| | | | | |
|---|---|---|---|---|
| 2,559,482 A | * | 7/1951 | Votypka | 296/116 |
| 2,613,987 A | * | 10/1952 | Stanfield | 296/117 |
| 3,994,524 A | * | 11/1976 | Lehmann | 296/107 |
| 4,720,133 A | * | 1/1988 | Alexander et al. | 296/117 |
| 4,929,015 A | * | 5/1990 | Bauer | 296/116 |
| 5,004,291 A | * | 4/1991 | Bauer et al. | 296/116 |
| 5,042,868 A | * | 8/1991 | Nothaft et al. | 296/107 |
| 5,096,251 A | * | 3/1992 | Pfertner et al. | 296/116 X |
| 5,207,474 A | * | 5/1993 | Licher et al. | 296/107 |
| 5,338,085 A | * | 8/1994 | Guckel et al. | 296/121 |
| 5,667,269 A | * | 9/1997 | Prenger et al. | 296/107 |
| 5,918,928 A | * | 7/1999 | Kolb et al. | 296/107.12 X |
| 5,971,470 A | * | 10/1999 | May et al. | 296/107.09 |

FOREIGN PATENT DOCUMENTS

| | | |
|---|---|---|
| DE | 196 18 296 | 8/1997 |
| DE | 197 31 330 | 2/1999 |
| GB | 882575 | 11/1961 |

* cited by examiner

*Primary Examiner*—D. Glenn Dayoan
*Assistant Examiner*—Lori L Coletta
(74) *Attorney, Agent, or Firm*—Nixon Peabody LLP; David S. Safran (57) ABSTRACT

The invention relates to a folding roof for a convertible with a canvas top which is held by the frame of the top, which frame has side roof rods, a main bow and a top mechanism supported on the body for opening and closing the folding roof, which contains one side main column which on the one hand is pivotally mounted on the body and on the other in a pivot joint on the roof rod and is adjoined by the canvas folding roof tensioned when the top is closed, the main bow (9) forming a roof cassette (10) which is permanently connected to the roof rod (8) and an additional rod (14; 14') being movably arranged in the area of the main column (3) and being kinematically coupled to a component (10; 4), especially a folding roof frame part or a body-mounted part, to which the additional rod (14; 14') executes relative motion when the main column (3) executes a pivoting motion, and the canvas top (26) adjoining or being attached to the additional rod (14; 14') and the additional rod (14; 14') executing motion controlled by the component (10; 4) for relieving or tensioning of the canvas folding roof (26) during pivoting motion of the main column (3) relative to the roof cassette (10) during opening and closing of the folding roof.

13 Claims, 6 Drawing Sheets

FOLDING ROOF FOR A CONVERTIBLE

BACKGROUND OF THE INVENTION

1. Field of the Invention

The invention relates to a folding roof for a convertible, with a canvas top which is held by a top frame, which frame has side roof rods, a main bow and a top mechanism supported on the body for opening and closing the folding roof, which contains a side main column, one end of which is pivotally mounted on the body and the other in a pivot joint on the roof rod and is adjoined by the canvas top which is tensioned when the top is closed.

2. Description of the Related Art

In a known folding roof of the above mentioned type, the main bow is permanently joined to the main column and is entrained with it when the folding roof is lowered into the rear storage space without relative movement to the main column. The canvas top attached to the main column and also to the main bow can thus be lowered without overstretching. Instead of a fixed attachment of the canvas top to the main column, or in a top frame construction with relative movement between the main bow and the main column during lowering, there can also be a wire cable which presses the canvas top against the main column for tensioning.

SUMMARY OF THE INVENTION

A primary object of the present invention is to devise a folding roof the initially mentioned type which has a canvas top which is protected against overstretching by the components which hold the canvas folding roof, even in folding roof frame structures which experience relative movement between the main bow and the main column when the roof is lowered into a rear storage space.

This object is achieved in accordance with the invention by the main bow forming a roof cassette which is permanently connected to the roof rod and by an additional rod being movably arranged in the area of the main column and being kinematically coupled to a component, especially a folding roof frame part or a body-mounted part, to which the additional rod executes relative motion when the main column executes a pivoting motion, the canvas top adjoining or being attached to the additional rod and the additional rod executing motion controlled by the component for relieving or tensioning of the canvas folding roof during pivoting motion of the main column relative to the roof cassette during opening and closing of the folding roof. The specifically movable additional rod can thus relieve the canvas top which can follow the roof cassette which continues to move during pivoting, by which overstretching of the canvas top is prevented. The roof rod which is permanently connected to the roof cassette can thus be a short, rear roof rod to which a front roof rod is pivotally coupled, or a side bearing component of the roof cassette.

When the component which is kinematically coupled to the additional rod is the roof cassette, a coupling can be established with a simple connection to this part, which is important for tensioning the folding roof. In one practical embodiment, in this case, the additional rod is movably supported on the main column, the canvas top is attached to the additional rod and a coupling means joins the additional rod to the roof cassette so that, in the pivoting motion of the main column relative to the roof cassette, the additional rod remains within a fixed distance to the coupling point of the coupling means on the roof cassette.

The coupling means can have different connecting elements, for example, rod levers or Bowden cables, but advantageously, also contains a coupling rod which is pivot mounted by a joint on the roof cassette and by a joint on the additional rod.

In another embodiment, the component which is kinematically coupled to the additional rod is a body-mounted part, especially a main bearing which is attached to the body for the pivoting main column. Thus, the relative motion of the main column to the body is used directly or via interposed gearing to control the motion of the additional rod. In one practical embodiment the additional rod is movably supported on the main column, the canvas top is attached to the additional rod, and a coupling means connects the additional rod to the body-mounted part, especially the main bearing, so that, in the pivoting motion of the main column relative to the roof cassette and to the body-mounted part, the additional rod remains within a fixed distance of the coupling point of the coupling means on the body-mounted part, especially the main bearing, and thus, also to the roof cassette.

Another advantageous embodiment calls for a telescoping additional rod arrangement, in which the additional rod is pivotally coupled to the body-mounted part, especially the main bearing, is guided to be able to move lengthwise on a guide element which is pivot mounted on the roof cassette, and in the pivoting motion of the main column, executes a relative displacement motion with respect to this guide element. The guide element can be, for example, a seal carrier to which a seal for the back section of a side window is attached. The additional rod as well as the seal carrier can be made as elongated, identically curved elements.

Another embodiment calls for the component which is kinematically coupled to the additional rod to be a section of the canvas top which is attached to the body. The canvas top which is attached to the equator of the body in this case represents the transfer of motion to the additional rod.

An advantageous embodiment of the top frame calls for the top mechanism to contain, on each side, a parallelogram-like four-bar mechanism with the main column and the main connecting rod which are pivot mounted at one end to the body and the other to a bearing component of the roof cassette. Thus, the roof cassette is easily pivoted rearward into the storage position in a largely horizontal alignment. However, also other mechanisms, such as gears or the like, can be used for the controlled pivoting motion of the roof cassette on the main column.

According to one advantageous embodiment, if the side roof rods are each divided into a front and a rear roof rod which, in the closed position of the folding roof, form an essentially rigid top frame which is releasably coupled to the front transverse frame, the coupling being released in the storage position of the opened canvas folding roof so as to be housed in a compact arrangement, and the roof cassette is securely attached to the rear roof rod, for example, by a pivot joint connection, the roof rod which is the front can be pivoted, one at a time, relative to the rear roof rod and when the folding roof is lowered can be located parallel to the main bow.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

A folding convertible roof contains a frame 1 with side roof rods and with a mechanism 2 located in the area of the C column for lowering the frame with the canvas top attached to it into a storage space when the folding roof is completely opened, and for extending it when the folding roof is being closed. The following description refers to the left-side elements of the folding roof which is made essentially symmetrically to the lengthwise center plane of the vehicle, so that the descriptions apply as well to the corresponding right-side elements.

The folding roof mechanism 2, which is formed in the embodiment shown as a four-bar mechanism which is built like a parallelogram, has a main column 3 (see, FIGS. 1 & 2) which is pivotally attached at one end to a bracket or the main bearing plate 4 of the body of the vehicle at a bottom pivot joint 5 and is pivotally attached at the other end to a bearing component 6 at a top pivot joint 7. The bearing component 6 is permanently joined to a side roof rod 8 of the frame 1 of the roof or an integral part of the roof rod 8 that forms the rear end of the roof rod 8.

Figure 1:
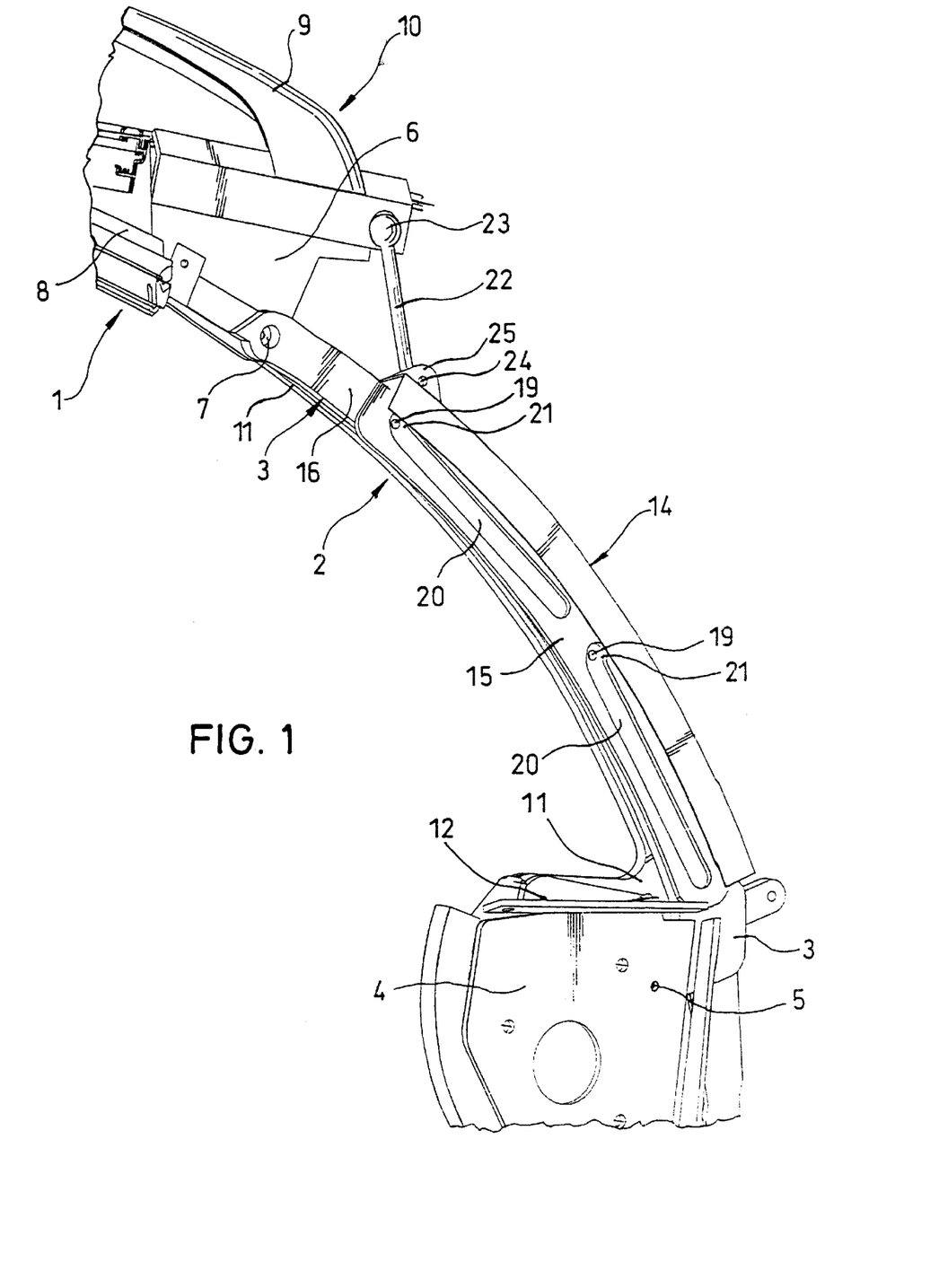
FIG. 1 is a perspective view a first embodiment of an additional rod on the main column of the mechanism of a folding roof in the initial position.
Figure 2:
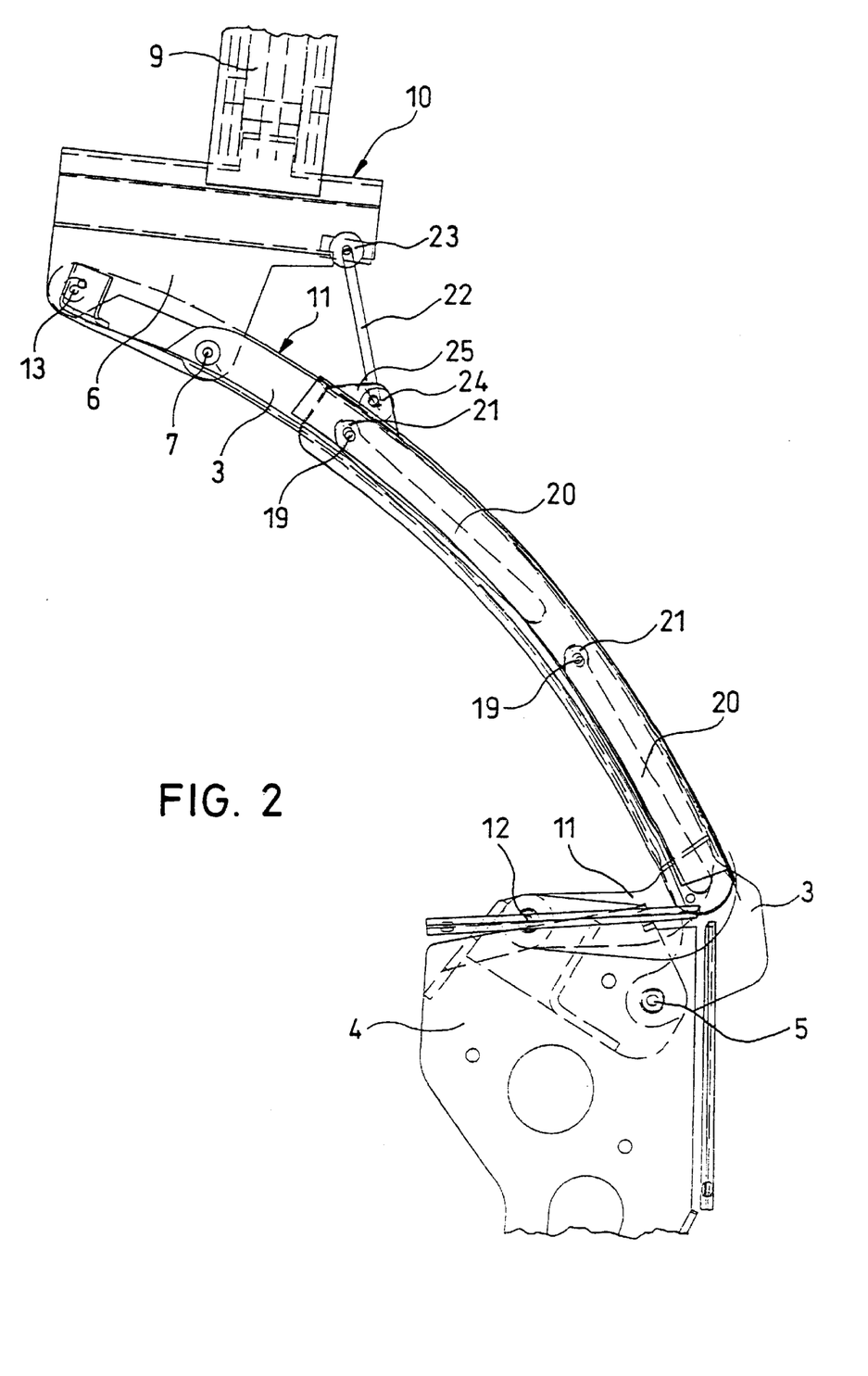
FIG. 2 is a side view of the additional rod which is shown in FIG. 1.

The main bow 9 is permanently attached to the bearing component 6 and joins this bearing component 6 to the corresponding bearing component at the opposite lateral side of the roof (not shown). This permanently connected unit formed of the two bearing components 6 and the main bow 9 which arches over the width of the folding roof is called a roof cassette 10 which extends clearly above the pivot joint 7 and to the rear projecting over it to achieve sufficient head room under the canvas folding roof.

Furthermore, the four-bar mechanism 2 has a main connecting rod 11 which is located approximately next to the main column 3 toward the vehicle interior. One end of the main connecting rod 11 is pivotally attached to the main bearing plate 4 at a bottom pivot joint 12 and an opposite end is pivotally attached to the bearing component 6 at a top pivot joint 13.

Figure 5:
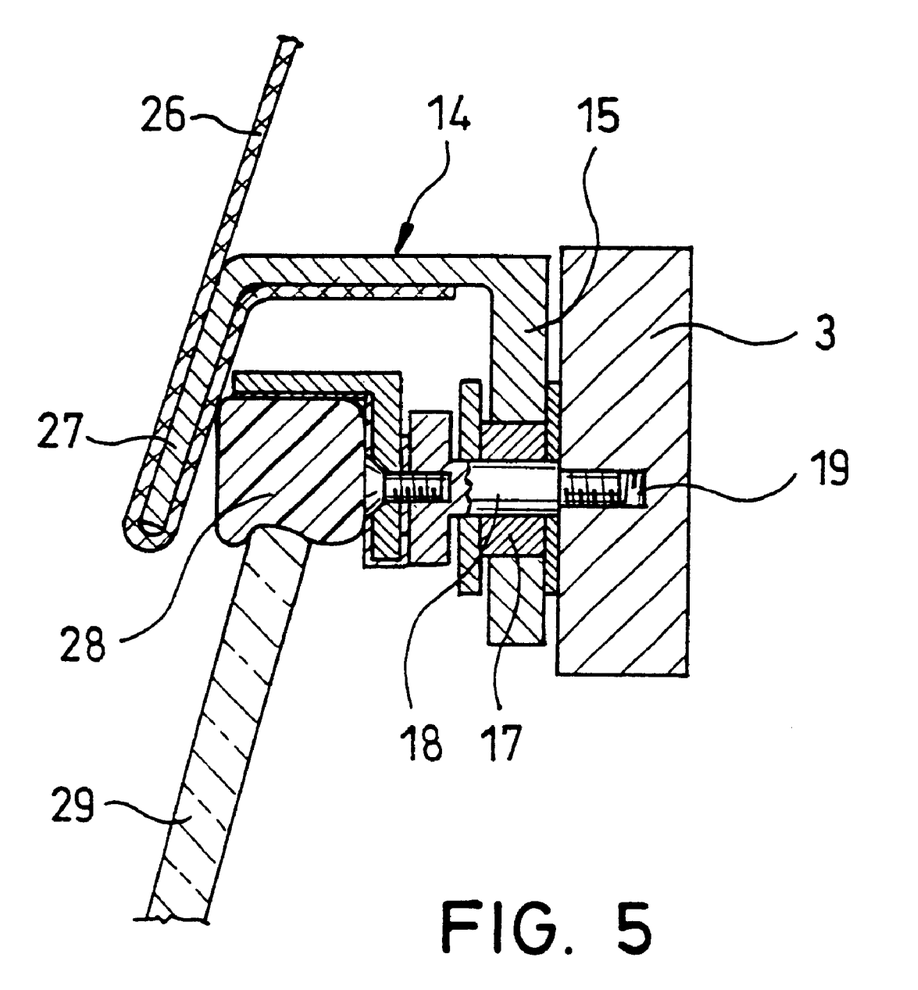
FIG. 5 is a cross-sectional view of the additional rod with the canvas top attached thereto on the main column.

An elongated additional rod 14, which is roughly U-shaped in cross section, is attached to the main column 3, one leg 15 of which is located parallel to the outside surface 16 of the main column 3 and is spaced slightly away from it, or directly adjoins it, and is guided for displacement lengthwise along the main column 3 via two rollers 17 (see, FIG. 5) which are pivotally mounted on pins 18 which are attached in holes 19 of the main column 3 and can move in two elongated recesses which are made in the leg 15 or in link paths 20. The two link paths 20 have laterally formed curve sections 21 on their ends adjacent to the roof cassette 10, such that the additional rod 14, at the start of its displacement lengthwise out of the position shown in FIG. 1, executes a short lifting or transverse motion which is directed upward.

To produce its relative lengthwise displacement on the main column 3, the additional rod 14 is connected via a coupling or kinematic connection in the form of a coupling rod 22 to the roof cassette 10. The coupling rod 22 joins the roof cassette 10 to the additional rod 14 and is coupled with a ball joint 23 to the rear end area of the bearing component 6 and with a ball joint 24 to a projection 25 of the additional rod 14.

The canvas top 26 (see, FIG. 5) is attached to the inside of the additional rod 14 and runs around its free leg 27 to the outside and then upward and across to the opposite additional rod on the right side of the folding roof, being held by the main bow 9 and optionally by another tension bracket. The canvas top 26, in the closed position shown in FIGS. 1 and 2, is tautly tensioned over the main bow 9, and furthermore, is attached to the top edge of the body or the equator on the box for the folding roof or the storage space behind the main bearing plate 4. An elongated seal 28, for example, a rubber profile, is securely attached via the pin 18 to the main column 3 and with the folding roof closed adjoins the top edge of a side window 29 of the vehicle.

Figure 3:
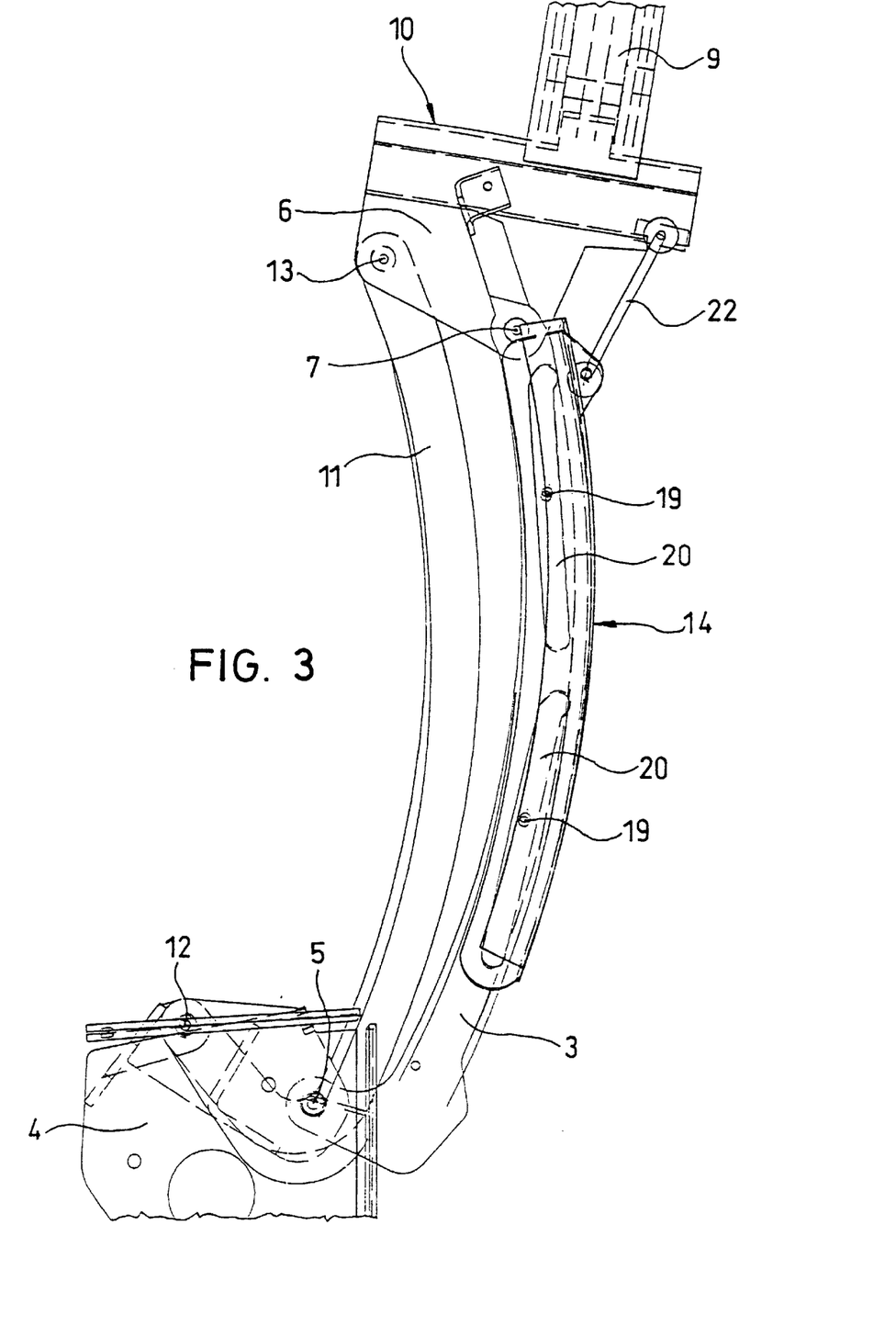
FIG. 3 is a side view of the additional rod in an intermediate position after pivoting of the main column when the folding roof is being lowered.

When, during opening of the folding roof, the frame 1 of the top is moved from the closed position shown in FIGS. 1 and 2 by a drive which acts on the four-bar mechanism 2 and which pivots especially the main column 3 clockwise from the position shown in FIG. 2 into the position shown in FIG. 3, the roof cassette 10 is shifted to the rear with a roughly uniform horizontal alignment. At the same time, the coupling rod 22 pulls the additional rod 14 along the main column 3 in the direction toward the roof cassette 10. As a result of the curve sections 21, the additional rod 14 initially executes a short lifting motion to release the inside of the canvas top 26 from the seal 28. In this way, the distance from the attachment of the canvas folding roof to the additional rod 14, as far as the roof cassette 10 and the main bow 9, is at least maintained or feasibly reduced according to the kinematic configuration, so that overstretching of the canvas folding roof is prevented.

In the end position of the completely pivoted four-bar mechanism 2 (see, FIG. 4) in which the main column 3 adjoins a stop and in which the frame 1 with the canvas folding roof 26 is lowered into the storage space, the additional rod 14, which is kinematically coupled via the coupling rod 22, transverses its maximum displacement path so that the canvas folding roof 26 is loosely lowered without overstretching to the main bow 9 and the roof cassette 10.

The four-bar mechanism 2 with the additional rod 14 is suitable for different frames 1 of a folding roof with one-part side roof rods and also with multi-part roof rods which can also be differently divided, the rear roof rod or the roof rod section or an identical component being securely connected to the main bow 9 or the roof cassette 10. This frame 1 of the folding roof can be folded in any way for opening and closing.

Figure 4:
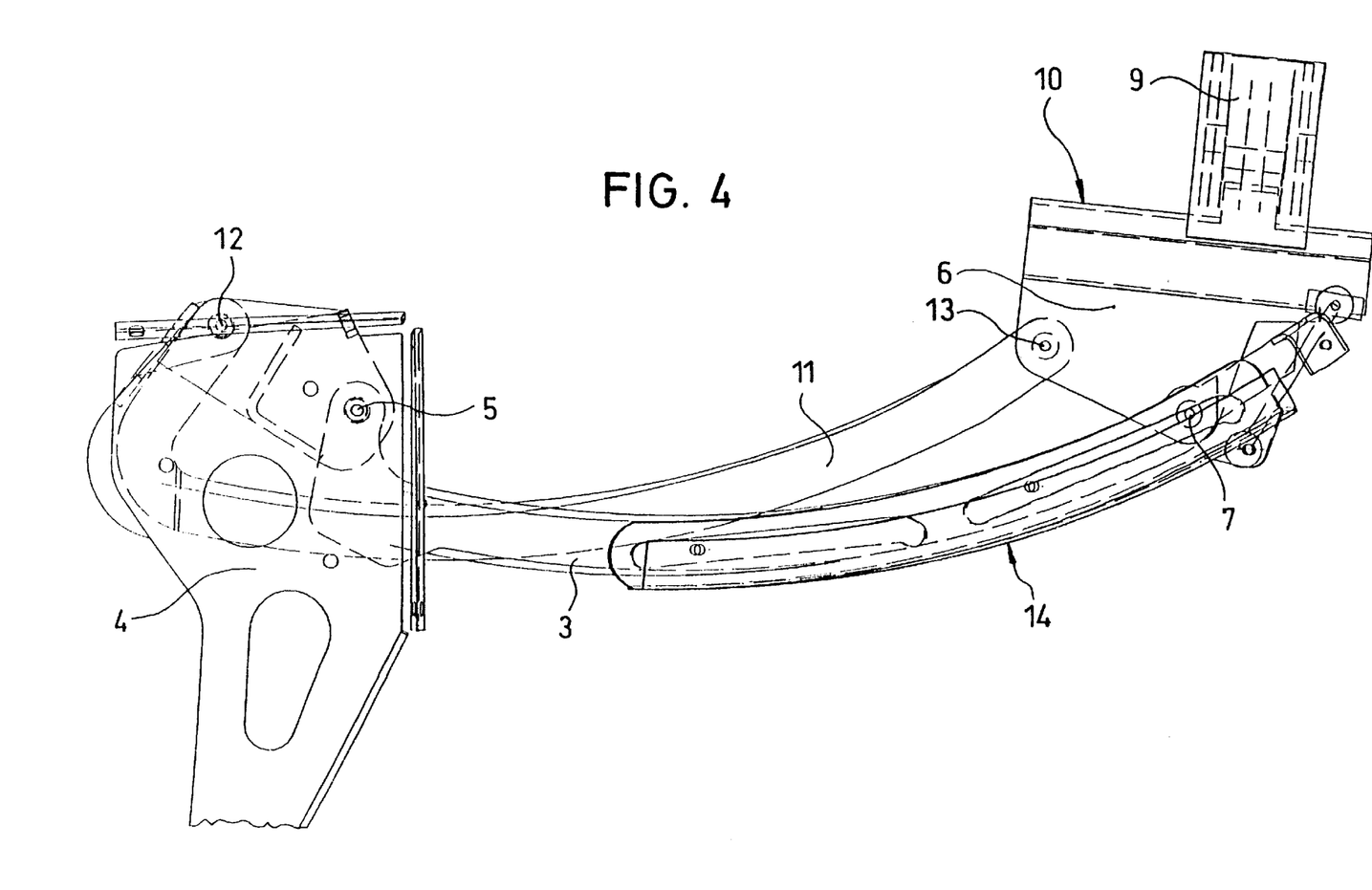
FIG. 4 is a side view of the additional rod in an end position after pivoting of the main column into the storage position of the folding roof.

The folding roof is closed as the main column 3 and the main connecting rod 11 of the four-bar mechanism 2 are pivoted in the opposite direction of movement from the lowered position, as shown in FIG. 4, via the illustrated intermediate positions in FIG. 3, into the end position in FIG. 2. In doing so, the additional rod 14 is pushed along on the main column 3 back into its initial position, pulling the canvas folding roofback down to the equator on the final path of motion and holding it tensioned.

Figure 6:
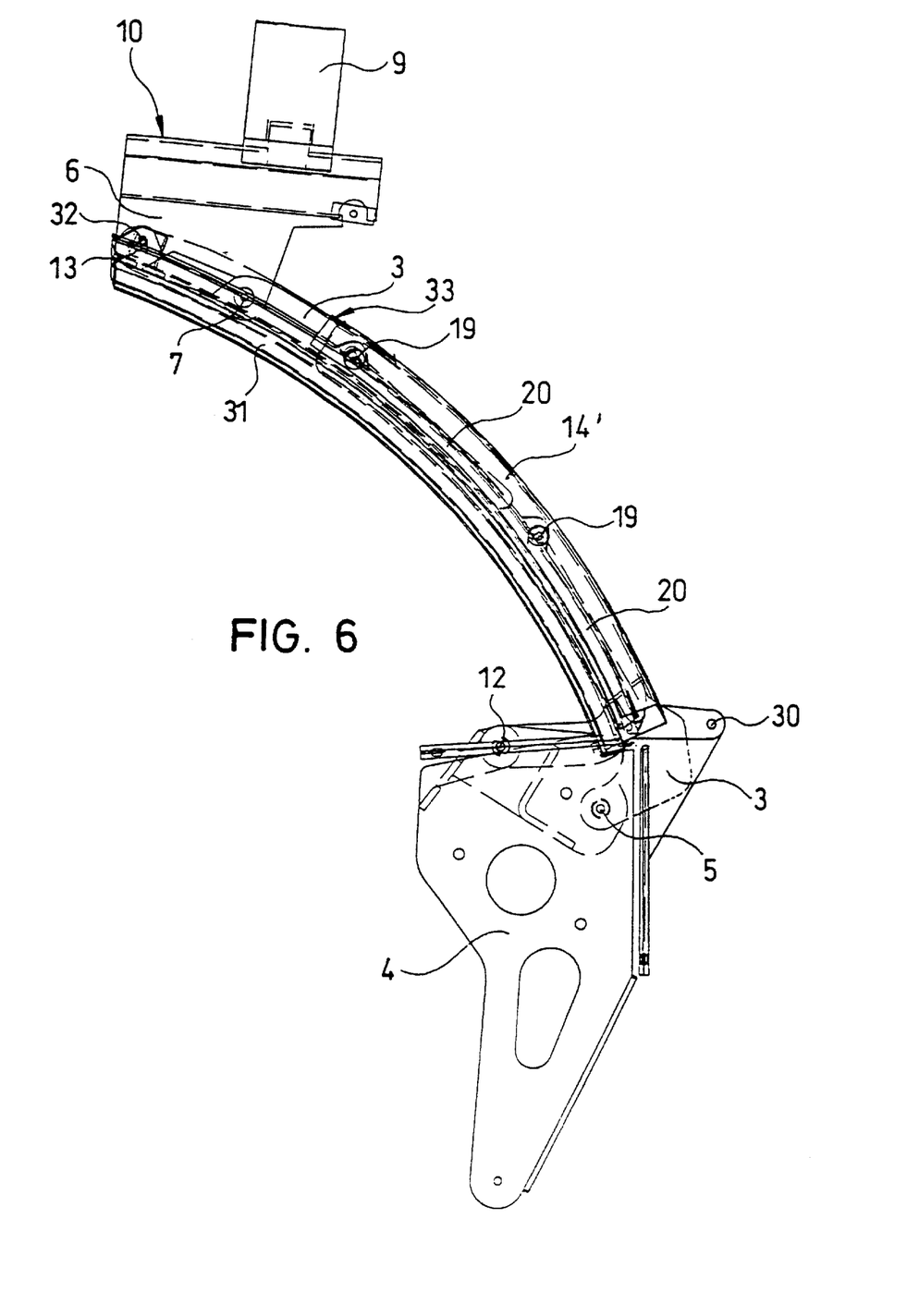
FIG. 6 is a side view of a second embodiment of the additional rod of the top mechanism in the initial position.

In the second embodiment which is shown in FIG. 6, the additional rod 14', which is made similarly to the above described first additional rod 14, is pivotally mounted at a pivot joint 30 on the main bearing 4, and is guided to move lengthwise on the seal carrier 31 which is pivotally mounted in a pivot bearing 32 on the bearing component 6 in the manner of a telescoping means. In doing so, the two rollers 19 of the seal carrier 31 are held in the lengthwise guides 20 of the additional rod 14' according to the above described embodiment. The canvas folding roof is attached to the additional rod 14', conversely, it is not attached to the seal carrier 31, but adjoins it, tensioned with the folding roof closed.

When the main column 3 is pivoted clockwise around its bottom pivot joint 5 by the drive to open the folding roof, the additional rod 14' and the seal carrier 31 are displaced relative to one another, the top end 33 of the additional rod 14' approaching the pivot joint 32 of the seal carrier 31. The telescopic arrangement is thus shortened in the relevant area and relieves the canvas folding roof when the folding roof is lowered into the storage space. The effect of relieving the canvas folding roof by the additional rod 14' is determined by the kinematics dependent on the location of the pivot axes. Thus, by the arrangement of the pivot joint 30 further to the right and/or above the pivot joint 5 of the main column 3 shown in FIG. 6, relief of the canvas folding roof relative to the rear section of the roof cassette 10 which moves away during pivoting can be further improved.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Folding roof for a convertible comprising:
   a frame having side roof rods;
   a canvas top which is held by the frame;
   a main bow; and
   a top mechanism adapted for being supported on a vehicle body for opening and closing the canvas top, said top mechanism having, at each side, a side main column which is adapted to be pivotally mounted at one end on the vehicle body and at an opposite end is pivotally mounted at a pivot joint on a respective one of the side roof rods, the canvas top being tensioned over the top mechanism when the top is closed;
   wherein the main bow forms a roof cassette which is permanently connected to the side roof rods; wherein an additional rod is movably arranged in the area of the main column and is kinematically coupled to a component relative to which the additional rod executes a relative motion when the main column pivots; wherein the canvas top adjoins the additional rod and the additional rod is mounted to execute a motion controlled by said component for relieving tensioning of the canvas folding roof during an opening pivoting motion of the main column relative to the roof cassette and for tensioning the canvas folding roof during pivoting motion of the main column relative to the roof cassette during closing of the folding roof; and wherein the component to which the additional rod is kinematically coupled is one of a folding roof frame part and a part that is adapted to be mounted to the vehicle body.

2. Folding roof for a convertible comprising:
   a frame having side roof rods;
   a canvas top which is held by the frame;
   a main bow; and
   a top mechanism adapted for being supported on a vehicle body for opening and closing the canvas top, said top mechanism having, at each side, a side main column which is adapted to be pivotally mounted at one end on the vehicle body and at an opposite end is pivotally mounted at a pivot joint on a respective one of the side roof rods, the canvas top being tensioned over the top mechanism when the top is closed;
   wherein the main bow forms a roof cassette which is permanently connected to the side roof rods; wherein an additional rod is movably arranged in the area of the main column and is kinematically coupled to a component relative to which the additional rod executes a relative motion when the main column pivots; wherein the canvas top adjoins the additional rod and the additional rod is mounted to execute a motion controlled by said component for relieving tensioning of the canvas folding roof during an opening pivoting motion of the main column relative to the roof cassette and for tensioning the canvas folding roof during pivoting motion of the main column relative to the roof cassette during closing of the folding roof; and wherein the component which is kinematically coupled to the additional rod is the roof cassette.

3. Folding roof as claimed in claim 2, wherein the additional rod is movably supported on the main column; wherein the canvas top is attached to the additional rod; and wherein a coupling means joins the additional rod to the roof cassette so that, during the pivoting motion of the main column relative to the roof cassette, the additional rod remains within a fixed distance of the coupling point of the coupling means on the roof cassette.

4. Folding roof as claimed in claim 3, wherein the coupling means comprises a coupling rod which is pivot mounted to a joint on the roof cassette and to a joint on the additional rod.

5. Folding roof for a convertible comprising:
   a frame having side roof rods;
   a canvas top which is held by the frame;
   a main bow; and
   a top mechanism adapted for being supported on a vehicle body for opening and closing the canvas top, said top mechanism having, at each side, a side main column which is adapted to be pivotally mounted at one end on the vehicle body and at an opposite end is pivotally mounted at a pivot joint on a respective one of the side roof rods, the canvas top being tensioned over the top mechanism when the top is closed;
   wherein the main bow forms a roof cassette which is permanently connected to the side roof rods; wherein an additional rod is movably arranged in the area of the main column and is kinematically coupled to a component relative to which the additional rod executes a relative motion when the main column pivots; wherein the canvas top adjoins the additional rod and the additional rod is mounted to execute a motion controlled by said component for relieving tensioning of the canvas folding roof during an opening pivoting motion of the main column relative to the roof cassette and for tensioning the canvas folding roof during pivoting motion of the main column relative to the roof cassette during closing of the folding roof; and wherein the component to which the additional rod is kinematically coupled is a part that is adapted to be mounted to the vehicle body.

6. Folding roof as claimed in claim 5, wherein the part that is adapted to be mounted to the vehicle body is a main bearing for the main column.

7. Folding roof as claimed in claim 5, wherein the additional rod is movably supported on the main column; wherein the canvas top is attached to the additional rod; and wherein a coupling means joins the additional rod to the part that is adapted to be mounted to the vehicle body, such that, during pivoting motion of the main column relative to the roof cassette and relative to the part that is adapted to be mounted to the vehicle body, the additional rod remains within a fixed distance of the coupling point of the coupling means on the body-mounted part.

8. Folding roof as claimed in claim 1, wherein the additional rod is pivotally coupled to the part that is adapted to be mounted to the vehicle body; wherein a guide element is provide which guides movement of the additional rod in a lengthwise direction along the main column, said guide element being pivotally mounted to the roof cassette; and wherein the additional rod executes a relative displacement motion relative to said guide element during pivoting, motion of the main column.

9. Folding roof for a convertible comprising:

a frame having side roof rods;

a canvas top which is held by the frame;

a main bow; and a top mechanism adapted for being supported on a vehicle body for opening and closing the canvas top, said top mechanism having, at each side, a side main column which is adapted to be pivotally mounted at one end on the vehicle body and at an opposite end is pivotally mounted at a pivot joint on a respective one of the side roof rods, the canvas top being tensioned over the top mechanism when the top is closed;

wherein the main bow forms a roof cassette which is permanently connected to the side roof rods; wherein an additional rod is movably arranged in the area of the main column and is kinematically coupled to a component relative to which the additional rod executes a relative motion when the main column pivots; wherein the canvas top adjoins the additional rod and the additional rod is mounted to execute a motion controlled by said component for relieving tensioning of the canvas folding roof during an opening pivoting motion of the main column relative to the roof cassette and for tensioning the canvas folding roof during pivoting motion of the main column relative to the roof cassette during closing of the folding roof; and wherein the component to which the additional rod is kinematically coupled is a section of the canvas top which is adapted to be attached to the body.

10. Folding roof for a convertible comprising:

a frame having side roof rods;

a canvas top which is held by the frame;

a main bow; and a top mechanism adapted for being supported on a vehicle body for opening and closing the canvas top, said top mechanism having, at each side, a side main column which is adapted to be pivotally mounted at one end on the vehicle body and at an opposite end is pivotally mounted at a pivot joint on a respective one of the side roof rods, the canvas top being tensioned over the top mechanism when the top is closed;

wherein the main bow forms a roof cassette which is permanently connected to the side roof rods; wherein an additional rod is movably arranged in the area of the main column and is kinematically coupled to a component relative to which the additional rod executes a relative motion when the main column pivots; wherein the canvas top adjoins the additional rod and the additional rod is mounted to execute a motion controlled by said component for relieving tensioning of the canvas folding roof during an opening pivoting motion of the main column relative to the roof cassette and for tensioning the canvas folding roof during pivoting motion of the main column relative to the roof cassette during closing of the folding roof; and wherein the top mechanism comprises a parallelogram-like four-bar mechanism with the main column and a main connecting rod which are adapted to be pivot mounted on the body at one end and on a bearing component of the roof cassette at an opposite end.

11. Folding roof as claimed in claim 2, wherein the additional rod extends along a longitudinally extending, lateral side of the main column.

12. Folding roof as claimed in claim 11, wherein the additional rod is displaceable longitudinally relative to the main column in a direction counter to a movement direction of the main column relative to the roof cassette.

13. Folding roof as claimed in claim 11, wherein the additional rod is kinematically coupled to the roof cassette by a coupling rod that is pivotally connected at one end to the roof cassette and at an opposite end to the additionally rod.

* * * * *